(12) United States Patent  
Bailey et al.

(10) Patent No.: US 8,375,049 B2  
(45) Date of Patent: *Feb. 12, 2013

(54) QUERY REVISION USING KNOWN HIGHLY-RANKED QUERIES

(75) Inventors: David R. Bailey, Palo Alto, CA (US); Alexis J. Battle, Palo Alto, CA (US); David Ariel Cohn, Palo Alto, CA (US); Barbara Engelhardt, San Francisco, CA (US); P. Pandurang Nayak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,896

(22) Filed: Sep. 7, 2010

(65) Prior Publication Data

US 2011/0060736 A1   Mar. 10, 2011

Related U.S. Application Data

(63) Continuation of application No. 11/285,814, filed on Nov. 22, 2005, now Pat. No. 7,870,147, which is a continuation-in-part of application No. 11/094,814, filed on Mar. 29, 2005, now Pat. No. 7,565,345, and a continuation-in-part of application No. 11/096,198, filed on Mar. 30, 2005, now Pat. No. 7,617,205, and a continuation-in-part of application No. 11/095,920, filed on Mar. 30, 2005, now abandoned.

(51) Int. Cl.  
*G06F 17/30* (2006.01)

(52) U.S. Cl. ....................................................... 707/767

(58) Field of Classification Search .................. None  
See application file for complete search history.

(56) References Cited

U.S. PATENT DOCUMENTS

| | | | |
|---|---|---|---|
| 5,826,260 | A | 10/1998 | Byrd et al. |
| 5,897,627 | A | 4/1999 | Leivian et al. |
| 6,006,221 | A | 12/1999 | Liddy et al. |
| 6,006,222 | A | 12/1999 | Culliss |
| 6,014,665 | A | 1/2000 | Culliss |
| 6,078,916 | A | 6/2000 | Culliss |
| 6,088,692 | A | 7/2000 | Driscoll |
| 6,169,986 | B1 | 1/2001 | Bowman et al. |
| 6,182,068 | B1 | 1/2001 | Culliss |
| 6,243,076 | B1 | 6/2001 | Hatfield |
| 6,285,999 | B1 | 9/2001 | Page |
| 6,311,175 | B1 | 10/2001 | Adriaans et al. |
| 6,397,211 | B1 | 5/2002 | Cooper |
| 6,411,950 | B1 | 6/2002 | Moricz et al. |
| 6,463,430 | B1 | 10/2002 | Brady et al. |
| 6,519,585 | B1 | 2/2003 | Kohli |
| 6,523,020 | B1 | 2/2003 | Weiss |
| 6,539,377 | B1 | 3/2003 | Culliss |
| 6,546,388 | B1 | 4/2003 | Edlund et al. |

(Continued)

FOREIGN PATENT DOCUMENTS

| | | |
|---|---|---|
| WO | 01/80070 A1 | 10/2001 |
| WO | 01/82134 A | 11/2001 |

OTHER PUBLICATIONS

"How the Vivisimo Clustering Engine Works," Vivisimo, Inc., 2003, 2 pages.

(Continued)

*Primary Examiner* — Yuk Ting Choi  
(74) *Attorney, Agent, or Firm* — Fish & Richardson P.C.

(57) ABSTRACT

An information retrieval system includes a query revision architecture providing one or more query revisers, each of which implements a query revision strategy. A query rank reviser suggests known highly-ranked queries as revisions to a first query by initially assigning a rank to all queries, and identifying a set of known highly-ranked queries (KHRQ). Queries with a strong probability of being revised to a KHRQ are identified as nearby queries (NQ). Alternative queries that are KHRQs are provided as candidate revisions for a given query. For alternative queries that are NQs, the corresponding known highly-ranked queries are provided as candidate revisions.

27 Claims, 8 Drawing Sheets

U.S. PATENT DOCUMENTS

| | | | |
|---|---|---|---|
| 6,546,389 B1 | 4/2003 | Agrawal et al. | |
| 6,651,054 B1 | 11/2003 | De Judicibus | |
| 6,671,711 B1 | 12/2003 | Pirolli et al. | |
| 6,675,159 B1 | 1/2004 | Lin et al. | |
| 6,701,309 B1* | 3/2004 | Beeferman et al. | 1/1 |
| 6,714,929 B1 | 3/2004 | Micaelian et al. | |
| 6,718,363 B1 | 4/2004 | Ponte | |
| 6,732,088 B1 | 5/2004 | Glance | |
| 6,738,764 B2 | 5/2004 | Mao et al. | |
| 6,751,611 B2 | 6/2004 | Krupin et al. | |
| 6,772,150 B1 | 8/2004 | Whitman et al. | |
| 6,782,390 B2 | 8/2004 | Lee et al. | |
| 6,799,176 B1 | 9/2004 | Page | |
| 6,829,599 B2 | 12/2004 | Chidlovskii | |
| 6,856,957 B1 | 2/2005 | Dumoulin | |
| 6,981,040 B1 | 12/2005 | Konig et al. | |
| 7,031,961 B2 | 4/2006 | Pitkow et al. | |
| 7,058,628 B1 | 6/2006 | Page | |
| 7,065,524 B1 | 6/2006 | Lee | |
| 7,222,127 B1 | 5/2007 | Bem et al. | |
| 7,293,017 B2 | 11/2007 | Hurst-Hiller et al. | |
| 7,383,258 B2 | 6/2008 | Harik et al. | |
| 7,437,349 B2* | 10/2008 | Basu et al. | 1/1 |
| 7,516,118 B1 | 4/2009 | Badros et al. | |
| 7,565,345 B2 | 7/2009 | Bailey et al. | |
| 7,617,205 B2 | 11/2009 | Bailey et al. | |
| 7,636,714 B1 | 12/2009 | Lamping et al. | |
| 7,870,147 B2 | 1/2011 | Bailey et al. | |
| 2002/0002438 A1 | 1/2002 | Ohmura et al. | |
| 2002/0016736 A1 | 2/2002 | Cannon et al. | |
| 2002/0083067 A1 | 6/2002 | Tamayo et al. | |
| 2003/0014399 A1 | 1/2003 | Hansen et al. | |
| 2003/0093408 A1 | 5/2003 | Brown et al. | |
| 2003/0135413 A1 | 7/2003 | Nishi et al. | |
| 2003/0144994 A1 | 7/2003 | Wen et al. | |
| 2003/0172075 A1 | 9/2003 | Reisman | |
| 2003/0210666 A1 | 11/2003 | Trossen et al. | |
| 2003/0212666 A1 | 11/2003 | Basu et al. | |
| 2003/0217052 A1 | 11/2003 | Rubenczyk et al. | |
| 2003/0220912 A1 | 11/2003 | Fain et al. | |
| 2004/0068486 A1* | 4/2004 | Chidlovskii | 707/3 |
| 2004/0083211 A1 | 4/2004 | Bradford | |
| 2004/0186827 A1 | 9/2004 | Anick et al. | |
| 2004/0199419 A1 | 10/2004 | Kim et al. | |
| 2004/0199498 A1 | 10/2004 | Kapur et al. | |
| 2004/0236721 A1 | 11/2004 | Pollack | |
| 2004/0254920 A1 | 12/2004 | Brill et al. | |
| 2005/0027691 A1 | 2/2005 | Brin et al. | |
| 2005/0044224 A1 | 2/2005 | Jun et al. | |
| 2005/0055341 A1 | 3/2005 | Haahr et al. | |
| 2005/0071337 A1 | 3/2005 | Baranczyk et al. | |
| 2005/0097092 A1 | 5/2005 | Annau et al. | |
| 2005/0125215 A1 | 6/2005 | Wu et al. | |
| 2005/0144158 A1* | 6/2005 | Capper et al. | 707/3 |
| 2005/0149499 A1 | 7/2005 | Franz et al. | |
| 2005/0198068 A1 | 9/2005 | Mukherjee et al. | |
| 2005/0210024 A1 | 9/2005 | Hurst-Hiller et al. | |
| 2005/0216454 A1 | 9/2005 | Diab et al. | |
| 2005/0216457 A1 | 9/2005 | Walther et al. | |
| 2005/0256848 A1 | 11/2005 | Alpert et al. | |
| 2006/0018551 A1 | 1/2006 | Patterson | |
| 2006/0023005 A1 | 2/2006 | Katsuyama et al. | |
| 2006/0026013 A1 | 2/2006 | Kraft | |
| 2006/0031214 A1 | 2/2006 | Solaro et al. | |
| 2006/0041560 A1 | 2/2006 | Forman et al. | |
| 2006/0074883 A1 | 4/2006 | Teevan et al. | |
| 2006/0218475 A1 | 9/2006 | Bodin et al. | |
| 2006/0230022 A1 | 10/2006 | Bailey | |
| 2007/0100804 A1* | 5/2007 | Cava | 707/3 |
| 2007/0106937 A1 | 5/2007 | Cucerzan et al. | |

OTHER PUBLICATIONS

Boyan, J.A. et al., "Learning Evaluation Functions for global Optimization and Boolean Satisfiability", 1998, [online] Retrieved from the Internet <URL:http://www.autonlab.org/autonweb/14682/version/2/part/5/data/boyan-learning.pdf?branch=main&language=en>.

Chang, D. T., "HieNet: A User-Centered Approach for Automatic Link Generation," ACM, Hypertext '93 Proceedings, Nov. 1993, pp. 145-158.

Cui, Hang et al., "Probabilistic Query Expansion Using Query Logs", Proceedings of the 11$^{th}$ International Conference on the World Wide Web, May 7-11, 2002, Honolulu, HI, 8 pages.

Jaczynski, M. et al., "Broadway: A Case-Based System for Cooperative Information Browsing on the World-Wide-Web," INRIA Sophia-Antipolis, Action AID, 12 pages.

Lee W. Young, PCT International Search Report and Written Opinion, PCT/US/06/09076, Sep. 20, 2007, 8 pages.

Dong Wong, PCT International Search Report and Written Opinion, PCT/US05/10681, Oct. 18, 2006, 7 pages.

Harmann, D., "Towards interactive query expansion," Proceedings of the 11$^{th}$ Annual International ACM-SIGIR Conference on Research and Development in Information Retrieval [Online] 1998, pp. 321-331, XP002527677 Grenoble, France, ISBN: 2-7061-0309-4, Retrieved from the Internet: URL:http://portal.acm.org/citation.cfm?id=62437.62469. [retrieved on May 12, 2009] *the whole document*.

Magennis et al., "The Potential and Actual Effectiveness of Interactive Query Expansion," Proceedings of the 20$^{th}$ Annual International ACM=SIGIR Conference on Research and Development in Information Retrieval, Philadelphia, PA, Jul. 27-31, 1997; [Annual International ACM=SIGIR Conference on Research and Development in Information Retrieval, Jul. 27, 1997, pp. 324-332, XP000782015, ISBN: 978-0-89791-836-7, *the whole document*.

Office Action for Application No. 05731419.7-2201, Reference EPP98293, mailed Sep. 23, 2009.

Weis et al.: Rule-based Machine Learning Methods for Functional Prediction, Journal of AI Research, vol. 3, Dec. 1995, pp. 383-403.

Crestani, F. et al., "Is This Document Relevant? . . . Probably": A Survey of Probablistic Models in Information Retrieval, ACM Computing Surveys, vol. 30., No. 4, Dec. 1998, pp. 528-552.

Friedman, J. et al., "Additive Logistic Regressing: A Statistical View of Boosting," Department of Statistics, Stanford University Technical Report, Aug. 20, 2009, pp. 1-44.

Joachims, T. et al., "Evaluating Retrieval Performance Using Clickthrough Data," Department of Computer Science, Cornell University, pp. 1-18.

Joachims, T. et al., "Optimizing Search Engines Using Clickthrough Data," Department of Computer Science, Cornell University, pp. 1-10.

Ng, A. et al., "On Discriminative vs. Generative Classifiers: A Comparison of Logistic Regression and Naïve Bayes," Dietterich (eds.), Advances in Neural Information Processing Systems 14, Cambridge, MA, MIT Press, 2002, pp. 841-848.

Supplementary European Search Report, EP06738165.7, dated Jan. 20, 2010.

Agnes Wittmann-Regis, International Preliminary Report on Patentability for PCT/US2005/010681, dated Oct. 18, 2006 (4 pages).

Office Action from U.S. Appl. No. 10/878,926, dated Dec. 12, 2006 (16 pages).

Agnes Wittmann-Regis, International Preliminary Report on Patentability for PCT/US2006/009076, dated May 15, 2007 (6 pages).

Office Action from U.S. Appl. No. 10/878,926, dated Jul. 17, 2007 (22 pages).

Office Action from U.S. Appl. No. 10/878,926, dated Aug. 14, 2008 (10 pages).

Office Action from U.S. Appl. No. 11/096,198, dated Mar. 5, 2009 (18 pages).

Chinese Office Action for Application No. 200680017106.6, dated Aug. 28, 2009 (7 pages).

Chinese Office Action for Application No. 200580049822.8, dated May 8, 2009 (15 pages).

Osmar Zaiane et al., "Finding Similar Queries to Satisfy Searches Based on Query Traces", 2002, OOIS 2002 Workshops, LNCS 2462, pp. 207-216.

Communication Pursuant to Article 94(3) EPC for Application No. 05731419.7, mailed Mar. 24, 2011, 6 pages.

Chinese Office Action for Application No. 200580017106.6, dated Dec. 31, 2011, 10 pages.

Extended European Search Report, European Application No. 11183625.0-2201, dated Dec. 8, 2011, 6 pages.
Canadian Office Action for Application No. 2,603,673 dated Sep. 6, 2011, 3 pages.
U.S. Appl. No. 11/090,302, filed Mar. 28, 2005, Lamping, et al.
Supplementary European Search Report for Application No. 05731419.7-2201, Reference EPP98293, mailed May 28, 2009 (4 pages).
Office Action from U.S. Appl. No. 10/878,926, dated Sep. 21, 2009 (10 pages).
Office Action from U.S. Appl. No. 10/878,926, dated Jan. 29, 2010 (17 pages).
Chinese Office Action for Application No. 200580049822.8, dated May 26, 2010 (14 pages).
Canadian Office Action for Application No. 2,603,718 dated Jul. 6, 2011, 3 pages.
Office Action for Application No. 2,603,718, dated Mar. 13, 2012, 3 pages.
Korean Office Action for Application No. 2007-7024804, dated Jun. 18, 2012, 3 pages.
Australian Office Action for Application 2006229761, dated Oct. 21, 2010, 3 pages.

* cited by examiner

QUERY REVISION USING KNOWN HIGHLY-RANKED QUERIES

CROSS-REFERENCE

This application claims benefit under 35 U.S.C. §120 from U.S. application Ser. No. 11/285,814, filed Nov. 22, 2005, entitled "Query Revision Using Known Highly-Ranked Queries," which is a continuation-in-part of each of the following applications: U.S. application Ser. No. 11/094,814, filed on Mar. 29, 2005, entitled "Integration of Multiple Query Revision Models"; U.S. application Ser. No. 11/096,198, filed on Mar. 30, 2005, entitled "Estimating Confidence for Query Revision Models"; and U.S. application Ser. No. 11/095,920, filed on Mar. 30, 2005, entitled "Empirical Validation of Suggested Alternative Queries." Each of the above-referenced applications are incorporated herein by reference in their entirety.

FIELD OF THE INVENTION

The present invention relates to information retrieval systems generally, and more particularly to systems and methods for revising user queries.

BACKGROUND

Information retrieval systems, as exemplified by Internet search engines, are generally capable of quickly providing documents that are generally relevant to a user's query. Search engines may use a variety of statistical measures of term and document frequency, along with linkages between documents and between terms to determine the relevance of document to a query. A key technical assumption underlying most search engine designs is that a user query accurately represents the user's desired information goal.

In fact, users typically have difficulty formulating good queries. Often, a single query does not provide desired results, and users frequently enter a number of different queries about the same topic. These multiple queries will typically include variations in the breadth or specificity of the query terms, guessed names of entities, variations in the order of the words, the number of words, and so forth, sometimes forming long chains of queries before reaching the desired result set. Because different users have widely varying abilities to successfully revise their queries, various automated methods of query revision have been proposed.

Most commonly, query refinement is used to automatically generate more precise (i.e., narrower) queries from a more general query. Query refinement is primarily useful when users enter over-broad queries whose top results include a superset of documents related to the user's information needs. For example, a user wanting information on the Mitsubishi Galant automobile might enter the query "Mitsubishi," which is overly broad, as the results will cover the many different Mitsubishi companies, not merely the automobile company. Thus, refining the query would be desirable (though difficult here because of the lack of additional context to determine the specific information need of the user).

However, query refinement is not useful when users enter overly specific queries, where the right revision is to broaden the query, or when the top results are unrelated to the user's information needs. For example, the query "Mitsubishi Galant information" might lead to poor results (in this case, too few results about the Mitsubishi Galant automobile) because of the term "information." In this case, the right revision is to broaden the query to "Mitsubishi Galant." Thus, while query refinement works in some situations, there are a large number of situations where a user's information needs are best met by using other query revision techniques.

Another query revision strategy uses synonym lists or thesauruses to expand the query to capture a user's potential information need. As with query refinement, however, query expansion is not always the appropriate way to revise the query, and the quality of the results is very dependent on the context of the query terms.

SUMMARY

An information retrieval system includes a query revision architecture that provides one or more different query revisers, each of which implements its own query revision strategy. Each query reviser evaluates a user query to determine one or more potential revised queries of the user query. A revision server interacts with the query revisers to obtain the potential revised queries. The revision server also interacts with a search engine in the information retrieval system to obtain for each potential revised query a set of search results. The revision server selects one or more of the revised queries for presentation to the user, along with a subset of search results for each of the selected revised queries. The user is thus able to observe the quality of the search results for the revised queries, and then select one of the revised queries to obtain a full set of search results for the revised query according to one embodiment.

A system and method use session-based user data to more correctly capture a user's potential information need based on analysis of strings of queries other users have formed in the past. To accomplish this, revised queries are provided based on data collected from many individual user sessions. For example, such data may include click data, explicit user data, or hover data. For a description of user feedback using hover data, see U.S. application Ser. No. 10/749,440, filed on Dec. 31, 2003, entitled "Methods and Systems for Assisted Network Browsing," which is incorporated herein by reference.

In one embodiment, a query rank reviser suggests one or more known highly-ranked queries as a revision to a first query. Initially, a query rank is assigned to all queries. The query rank reviser creates a table of queries and respective query ranks, identifying the highest ranked queries as known highly-ranked queries (KHRQ). Queries with a strong probability of being revised to a KHRQ are identified as nearby queries (NQ), a pointer from each NQ to the corresponding KHRQ(s) is stored, and the KHRQs and NQs queries are indexed.

For a given query, the query rank reviser determines a revision probability with respect to the indexed queries. Next, a revision score (RS) is calculated for each indexed query using the revision probability and query rank for the indexed query. Then the indexed queries with the highest revision scores are retrieved as alternative queries. Alternative queries that are KHRQs are provided as candidate revisions and for alternative queries that are NQs, the corresponding known highly-ranked queries are provided as candidate revisions, using the pointers stored in the index.

The present invention is next described with respect to various figures, diagrams, and technical information. The figures depict various embodiments of the present invention for purposes of illustration only. One skilled in the art will readily recognize from the following discussion that alternative embodiments of the illustrated and described structures,

DETAILED DESCRIPTION

System Overview

Figure 1A:
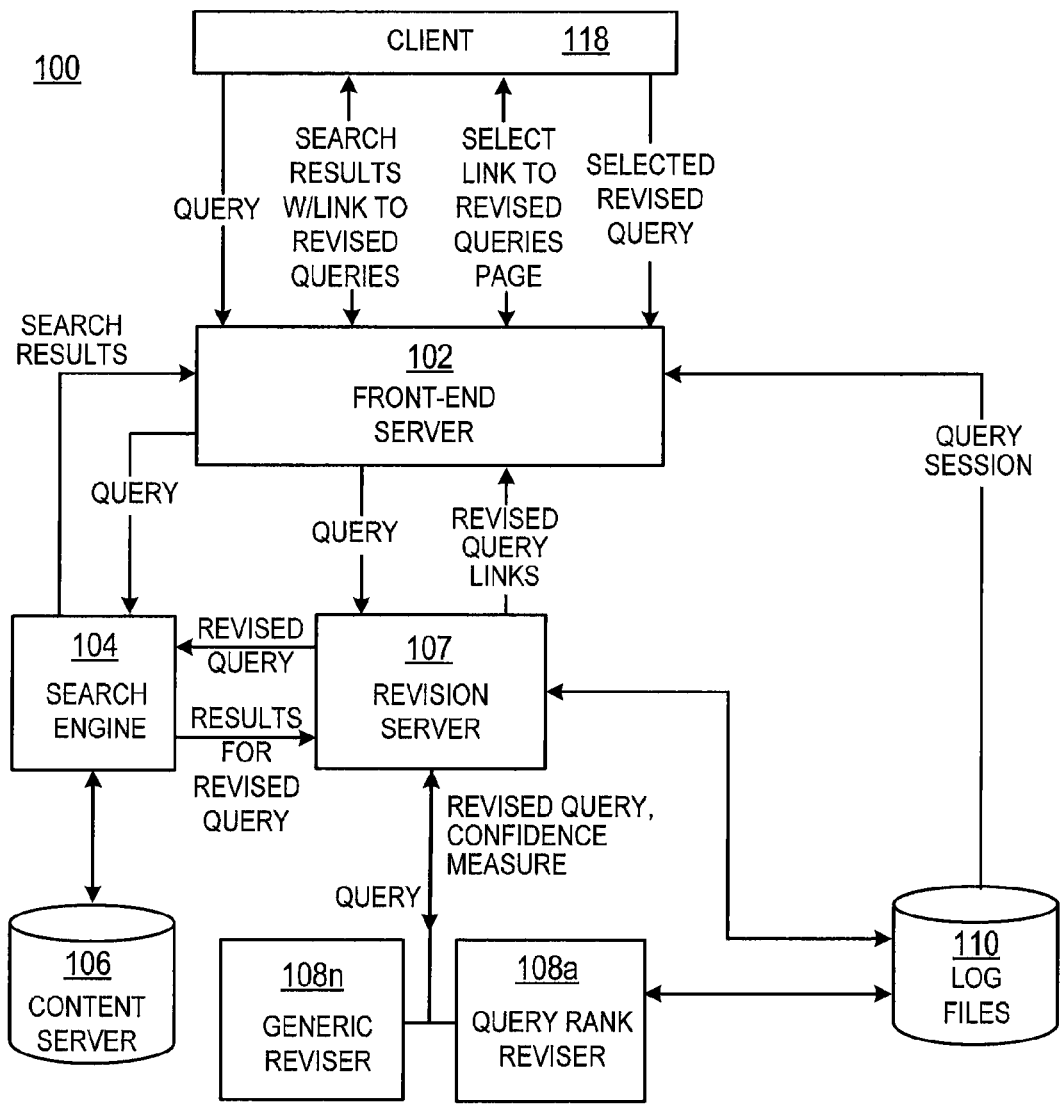
FIG. 1 is a system diagram of an embodiment of an information retrieval system providing for query revision according to one embodiment of the present invention.

FIG. 1a illustrates a system 100 in accordance with one embodiment of the present invention. System 100 comprises a front-end server 102, a search engine 104 and associated content server 106, a revision server 107, and one or more query revisers 108. During operation, a user accesses the system 100 via a conventional client 118 over a network (such as the Internet, not shown) operating on any type of client computing device, for example, executing a browser application or other application adapted to communicate over Internet related protocols (e.g., TCP/IP and HTTP). While only a single client 118 is shown, the system 100 can support a large number of concurrent sessions with many clients. In one implementation, the system 100 operates on high performance server class computers, and the client device 118 can be any type of computing device. The details of the hardware aspects of server and client computers is well known to those of skill in the art and is not further described here.

The front-end server 102 is responsible for receiving a search query submitted by the client 118. The front-end server 102 provides the query to the search engine 104, which evaluates the query to retrieve a set of search results in accordance with the search query, and returns the results to the front-end server 102. The search engine 104 communicates with one or more of the content servers 106 to select a plurality of documents that are relevant to user's search query. A content server 106 stores a large number of documents indexed (and/or retrieved) from different websites. Alternately, or in addition, the content server 106 stores an index of documents stored on various websites. "Documents" are understood here to be any form of indexable content, including textual documents in any text or graphics format, images, video, audio, multimedia, presentations, web pages (which can include embedded hyperlinks and other metadata, and/or programs, e.g., in Javascript), and so forth. In one embodiment, each indexed document is assigned a page rank according to the document's link structure. The page rank serves as a query-independent measure of the document's importance. An exemplary form of page rank is described in U.S. Pat. No. 6,285,999, which is incorporated herein by reference. The search engine 104 assigns a score to each document based on the document's page rank (and/or other query-independent measures of the document's importance), as well as one or more query-dependent signals of the document's importance (e.g., the location and frequency of the search terms in the document).

The front-end server 102 also provides the query to the revision server 107. The revision server 107 interfaces with one or more query revisers 108, each of which implements a different query revision strategy or set of strategies. In one embodiment, the query revisers 108 include a query rank reviser 108a. The revision server 107 provides the query to each reviser 108, and obtains in response from each reviser 108 one or more potential revised queries (called 'potential' here, since they have not been adopted at this point by the revision server 107). The system architecture is specifically designed to allow any number of different query revisers 108 to be used, for poor performing query revisers 108 to be removed, and for new query revisers 108 (indicated by generic reviser 108n) to be added as desired in the future. This gives the system 100 particular flexibility, and also enables it to be customized and adapted for specific subject matter domains (e.g., revisers for use in domains like medicine, law, etc.), enterprises (revisers specific to particular business fields or corporate domains, for internal information retrieval systems), or for different languages (e.g., revisers for specific languages and dialects).

Preferably, each revised query is associated with a confidence measure representing the probability that the revision is a good revision, i.e., that the revised query will produce results more relevant to the user's information needs than the original query. Thus, each potential revised query can be represented by the tuple $(R_i, C_i)$, where R is a potential revised query, and C is the confidence measure associated with the revised query. In one embodiment, these confidence measures are manually estimated beforehand for each revision strategy of each reviser 108. The measures can be derived from analysis of the results of sample queries and revised queries under test. In other embodiments, one or more of the revisers 108 may dynamically generate a confidence measure (e.g., at run time) for one or more of its potential revised queries. The assignment of confidence measures may be performed by other components (e.g., the revision server 107), and may take into account both query-dependent and query-independent data.

The revision server 107 can select one or more (or all) of the potential revised queries, and provide these to the search engine 104. The search engine 104 processes a revised query in the same manner as normal queries, and provides the results of each submitted revised query to the revision server 107. The revision server 107 evaluates the results of each revised query, including comparing the results for the revised query with the results for the original query. The revision server 107 can then select one or more of the revised queries as being the best revised queries (or at least revised queries that are well-suited for the original query), as described below.

The revision server 107 receives all of the potential revised queries R, and sorts them by their associated confidence measures C, from highest to lowest confidence. The revision server 107 iterates through the sorted list of potential revised queries, and passes each potential revised query to the search engine 104 to obtain a set of, search results. (Alternatively, the revision server 107 may first select a subset of the potential revised queries, e.g., those with a confidence measure above a threshold level). In some cases the top search results may already have been fetched (e.g., by a reviser 108 or the revision server 107) while executing a revision strategy or in estimating confidence measures, in which case the revision server 107 can use the search results so obtained.

For each potential revised query, the revision server 107 decides whether to select the potential revised query or discard it. The selection can depend on an evaluation of the top N search results for the revised query, both independently and with respect to the search results of the original query. Generally, a revised query should produce search results that are more likely to accurately reflect the user's information needs than the original query. Typically the top ten results are evaluated, though more or less results can be processed, as desired.

Figure 3:
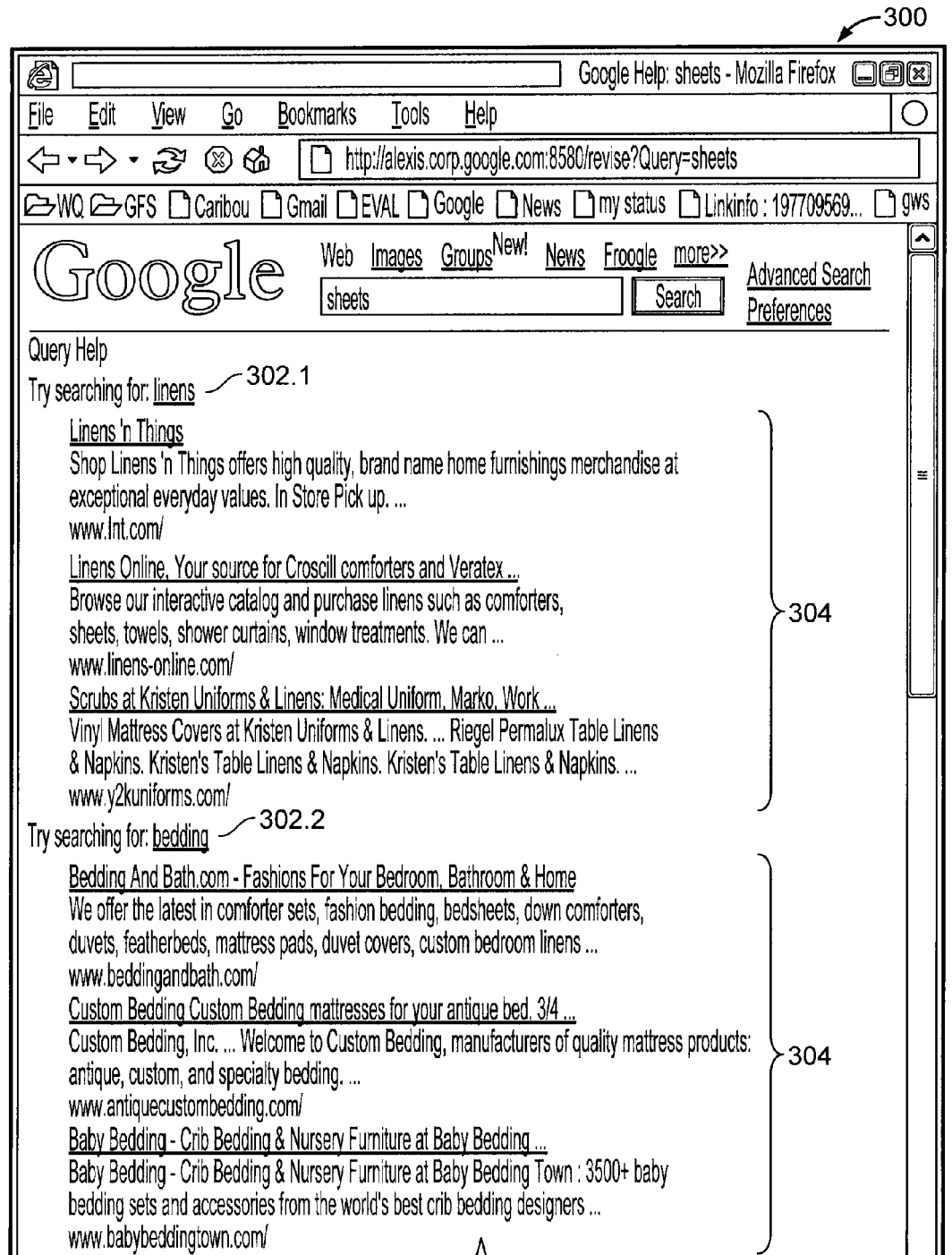
FIG. 3 is an illustration of a sample revised queries page according to one embodiment of the present invention.
Figure 3:
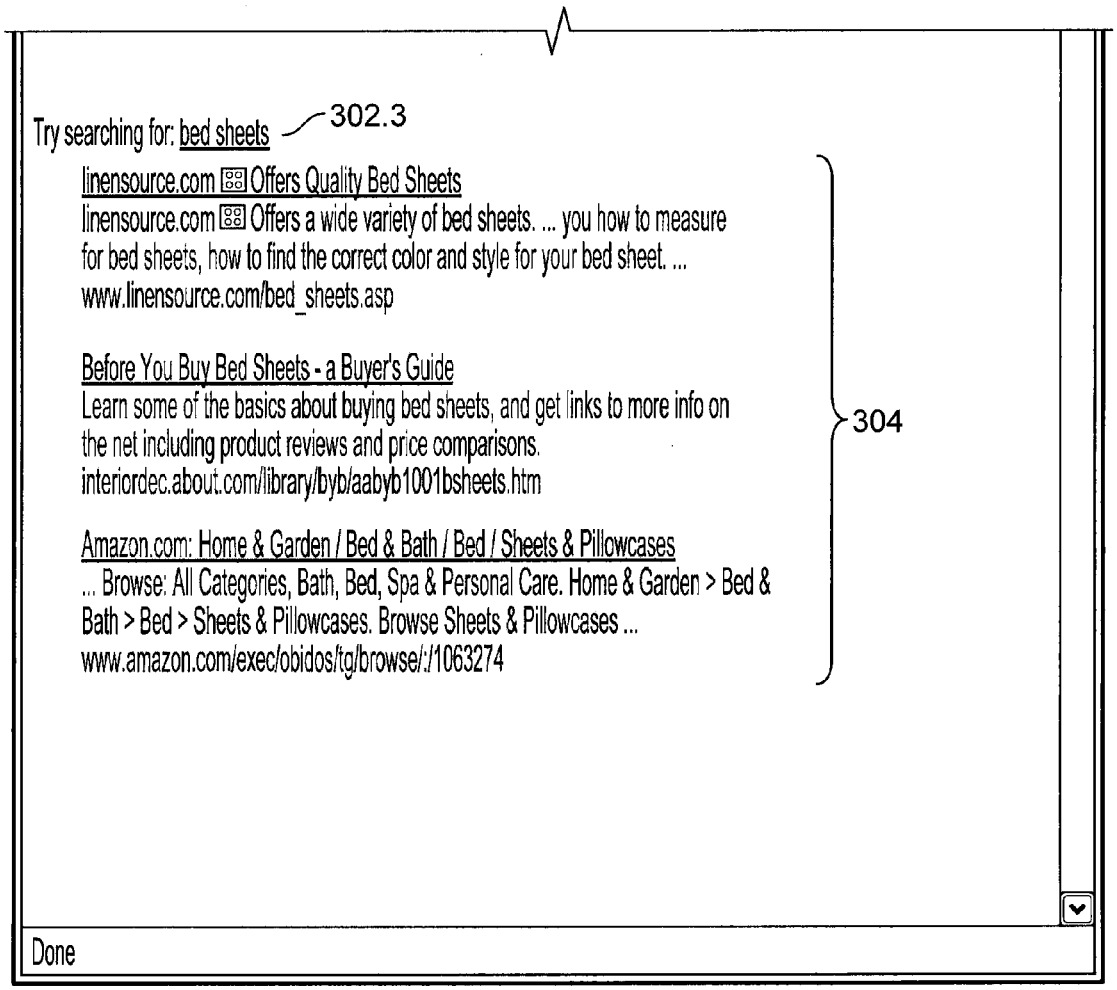

In one embodiment, a potential revised query is selected if the following conditions hold:

i) The revised query produces at least a minimum number of search results. For example, setting this parameter to 1 will discard all (and only) revisions with no search results. The general range of an acceptable minimum number of results is 1 to 100.

ii) The revised query produces a minimum number of "new" results in a revision's top results. A result is "new" when it does not also occur in the top results of the original query or a previously selected revised query. For example, setting this parameter to 2 would require each selected revision to have at least two top results that do not occur in the top results of any previously selected revised query or in the top results of the original query. This constraint ensures that there is a diversity of results in the selected revisions, maximizing the chance that at least one of the revisions will prove to, be useful. For example, as can be seen in FIG. 3, the top three results 304 for each revised query are distinct from the other result sets. This gives the user a broad survey of search results that are highly relevant to the revised queries.

iii) A maximum number of revised queries have not yet been selected. In other words, when a maximum number of revised queries have already been selected, then all remaining revised queries are discarded. In one embodiment, the maximum number of revised queries is set at 4. In another embodiment, the maximum number of revised queries is set between 2 and 10.

The results of the foregoing selection parameters are a set of selected revised queries that will be included on the revised queries page 300. The revision server 107 constructs a link to this page, and provides this link to the front-end server 102, as previously discussed. The revision server 107 determines the order and layout of the revised queries on the revised queries page 300. The revised queries are preferably listed in order of their confidence measures (from highest to lowest).

The front-end server 102 includes the provided links in a search results page, which is then transmitted to the client 118. The user can then review the search results to the original query, or select the link to the revised queries page, and thereby view the selected revised queries and their associated results.

Presentation of Revised Queries

Figure 2:
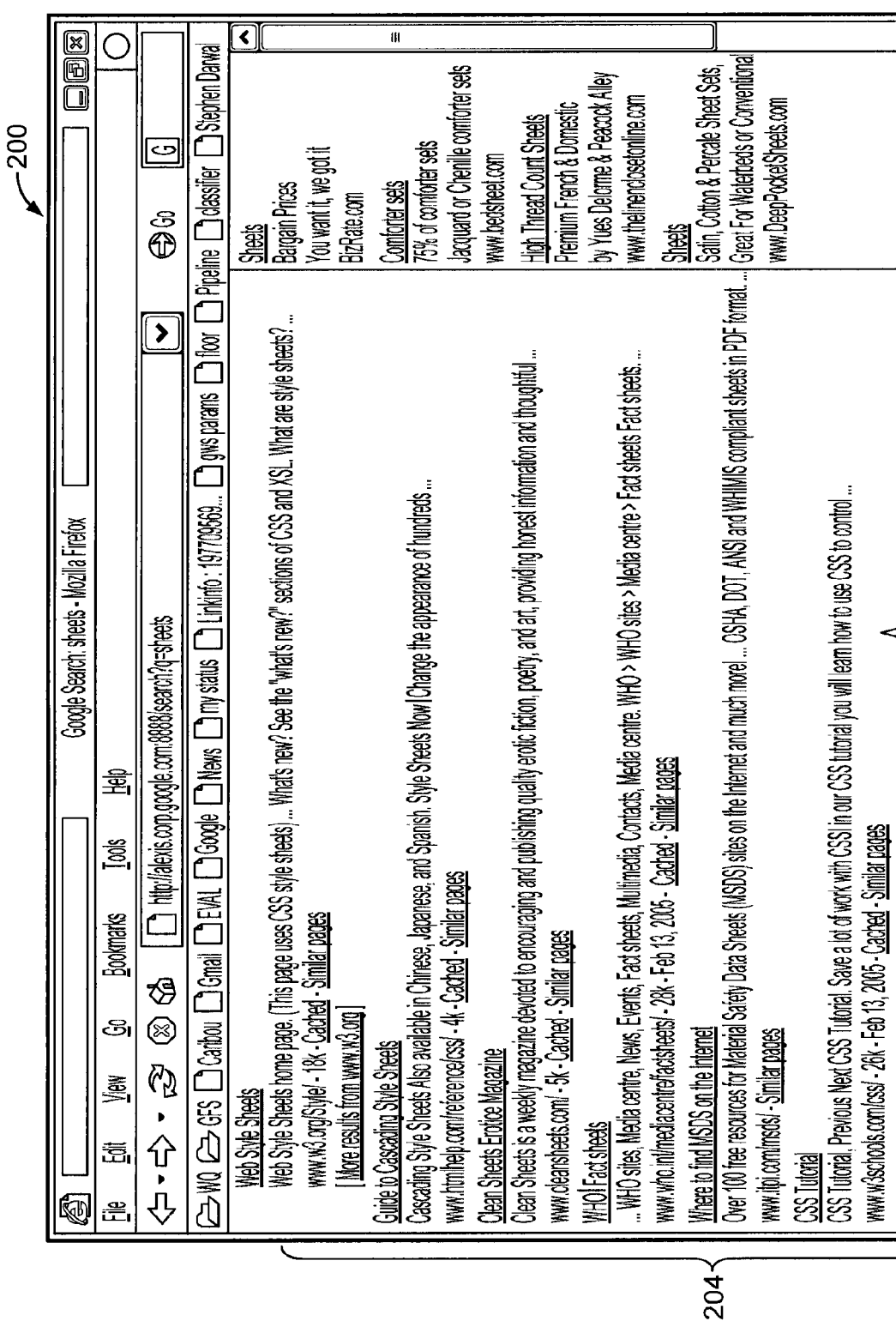
FIG. 2 is an illustration of a sample results page to an original user query according to one embodiment of the present invention.
Figure 2:
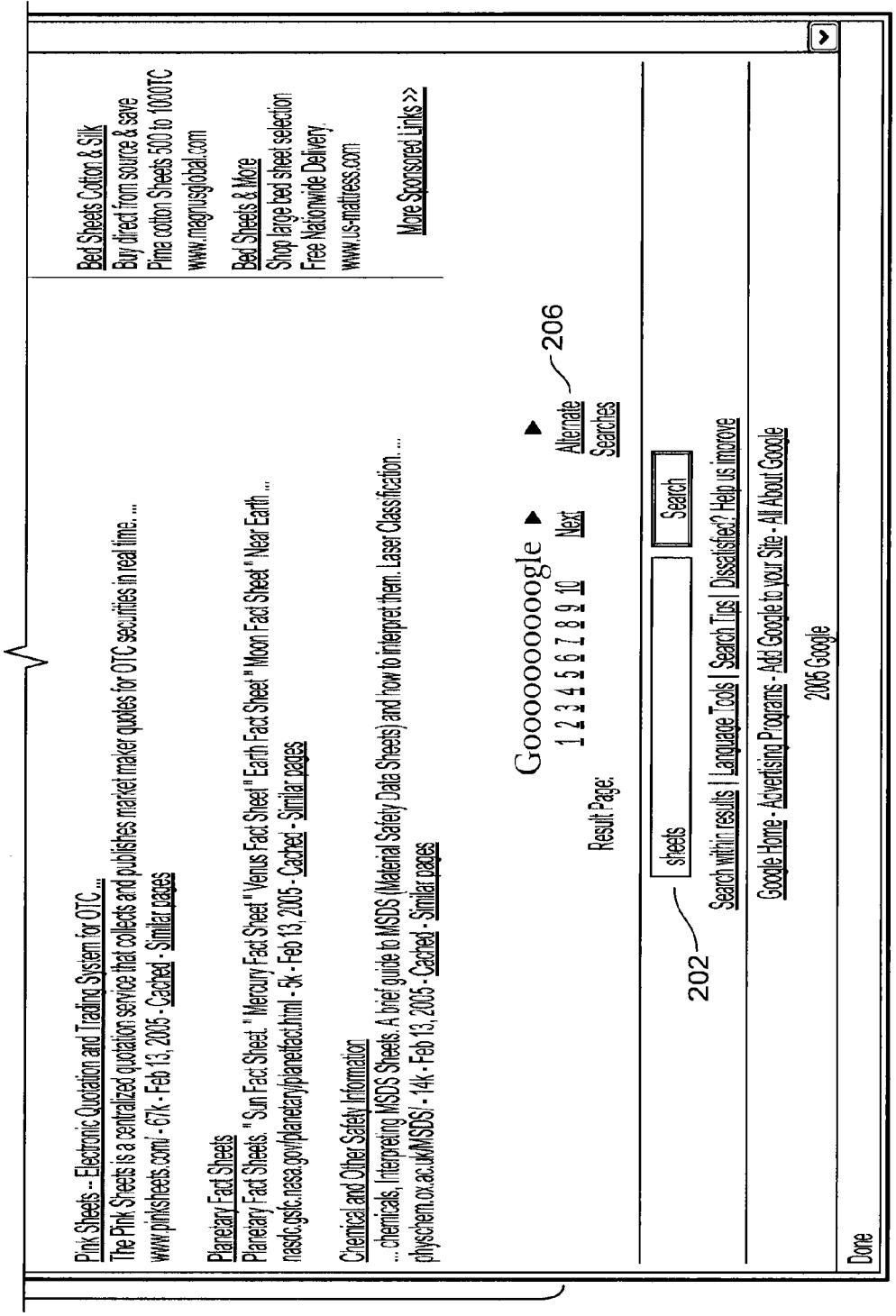

FIG. 2 illustrates a sample results page 200 provided to a client 118. In this simple implementation, the search results 200 page includes the original query 202 of [sheets] along with the results 204 to this query. A link 206 to a set of revised queries is included at the bottom of the page 200. The user can then click on the link 206, and access the page of revised queries. An example page 300 is shown in FIG. 3. Here, the top three revised queries are presented, as shown by revised query links 302.1, 302.2, and 302.3 for the revised queries of [linens], [bedding], and [bed sheets], respectively. Below each revised query link 302 are the top three search results 304 for that query.

There are various benefits to providing the revised queries on a separate page 300 from the original results page 200. First, screen area is a limited resource, and thus listing the revised queries by themselves (without a preview of their associated results), while possible, is less desirable because the user does not see revised queries in the context of their results. By placing the revised queries on a separate page 300, the user can see the best revised queries. And their associated top results, enabling the user to choose which revised query appears to best meet their information needs, before selecting the revised query itself. While it would be possible to include both the results of the original query and the revised queries on a single (albeit long) page, this approach would either require the user to scroll down the page to review all of the revised queries, or would clutter the initially visible portion of the page. Instead, in the preferred embodiment illustrated in FIGS. 2 and 3, the user can see results associated with query revisions, click on each revised query link 302, and access the entire set of search results for the selected revised query. In many cases this approach will also be preferable to automatically using the revised queries to obtain search results and automatically presenting them to the user (e.g., without user selection or interaction). In the example query revision described in conjunction with the query rank reviser, the benefits of this method are clear: [Britney Spears] would be a suggested query because of its high query rank, but does not get the user the desired information. Thus, it is helpful to display the results and query to the user for selection. In addition, this approach has the added benefit of indirectly teaching the user how to create better queries, by showing the best potential revisions. In another embodiment, the revision server 107 can force the query revisions to be shown on the original result page 200, for example, in a separate window or within the original result page 200.

The method of displaying additional information (e.g., search results 304), about query revisions to help users better understand the revisions can also be used on the main results page 200. This is particularly useful when there is a single very high quality revised query (or a small number of very high quality revisions) such as is the case with revisions that correct spellings. Spell corrected revised queries can be shown on the results page 200, along with additional information such as title, URL, and snippet of the top results to help the user in determining whether or not the spell correction suggestion is a good one.

In another embodiment, revision server 107 uses the confidence measures to determine whether to show query revisions at all, and if so, how prominently to place the revisions or the link thereto. This embodiment is discussed below.

Query Revising

Referring again to FIG. 1a, one embodiment of the query rank reviser 108a is now described. The rank reviser 108a can use any suitable method to suggest known highly-ranked queries that might better capture the user's information need based on analysis of chains of revisions to queries made by other users in the past. In general, a highly ranked query is one that occurs frequently relative to other queries, but that is revised infrequently relative to its occurrences. That users only infrequently revise such queries indicates that the results provided by such queries adequately match the users' information needs.

In one embodiment, the highly-ranked queries are identified as follows. Initially, the query rank reviser 108a assigns a query rank to all queries stored in log files 110. Query rank as used herein is defined using the occurrence frequency of a query (QF) and user satisfaction (US) with the query, e.g., the product of QF and US, i.e., (QR=QF×US). In one embodiment, user satisfaction is measured as inverse revision frequency (IRF). In other words, user satisfaction increases as revision frequency decreases. Revision frequency in one embodiment is defined as the number of times a query is revised divided by the total number of occurrences of the query. Thus, in this embodiment, query rank is defined as query occurrence frequency-inverse revision frequency (QF- IRF); again, reflecting that highly ranked queries occur frequently, but are revised infrequently.

In another embodiment, user satisfaction is defined by the quality of the query. In one embodiment, a quality score for a query is estimated from user click behavior data estimating the length of clicks on search results. One such method for determining quality scores is the use of interaction profiles, as described in U.S. application Ser. No. 10/878,926, "Systems and Methods for Deriving and Using an Interaction Profile," filed on Jun. 28, 2004, which is incorporated by reference. The quality score calculation is stored, for example, in log files 110. Quality scores are based on the estimated duration of a first selection of a search result, e.g., a first click on a search result. The duration of a given click is estimated from the times at which a first and subsequent selections occurred on search results, which times may be stored with other user session query data, for example in the log files 110. Scoring includes assigning search results in which the user did not select/click on a search result a score of zero, and proceeds along an S-curve applied to the duration between the first click and a subsequent click, with longer clicks approaching a quality score of 1. In one embodiment, the formula for the curve is $1/(1+e^{-(x-40s)/10s})$, wherein x is the duration between clicks, and the inflection points are 20 seconds corresponding to a quality score of 0.1, 40 seconds corresponding to a quality score of 0.5, and 60 seconds corresponding to a quality score 0.9. In, other embodiments, different curves are used in accordance with click durations believed to represent user satisfaction. For example, stretching the curve to the right would do a better job of rewarding clicks with very long durations, at the cost of reduced discrimination between short-duration clicks and no click at all. Clicks on unrelated content, for example banner ads, are excluded from the click analysis. In another embodiment, all result clicks for a query, rather than just the first, are collected. Thus, in this embodiment, query rank is defined as query occurrence frequency (QF) times quality (Q).

Query occurrence frequency (QF) is defined as the frequency per unit time, for example-frequency per hour according to one embodiment. Thus, as query occurrence frequency and inverse document frequency or quality increase, query rank increases toward 1. In other embodiments, query occurrence frequency may be defined in different ways.

Next, the query rank reviser 108a creates a table of queries and respective query ranks. From this data, the query rank reviser 108a identifies a subset of all queries as known highly-ranked queries (KHRQ). A known highly-ranked query is a query known to have a high query rank as described above, and as listed in the table of queries. In another embodiment, known highly-ranked queries are defined as the top X queries, e.g., the top 5,000 queries.

The query rank reviser 108a then identifies nearby queries (NQ), which are queries with a strong probability of revision (PR) to a KHRQ, as measured by the similarity between the NQ and a KHRQ. Similarity can be determined based on semantic similarity, syntactic similarity, behavioral similarity, or any combination thereof. In one embodiment, the similarity is behavioral similarity. In another embodiment, similarity includes the semantic similarity between the queries, for example considering factors such as lexical similarity and/or overlap in word clusters for the respective queries. In yet another embodiment, similarity includes the syntactic similarity between the queries, for example considering factors such as edit distance, term overlap, or other technique(s) commonly used in information retrieval. In yet another embodiment, similarity includes both semantic and syntactic similarity. In one embodiment, scoring similarity includes assigning a similarity score between 0 and 1, with more similar queries approaching a score of 1. For example, queries for which a word is misspelled by one character (e.g., [Brittney Spears] versus [Britney Spears]) have a high similarity score (e.g., 0.95), whereas a query that has a small term overlap (e.g., [When Harry Met Sally] versus [Metropolitan Life]) have a low similarity score (e.g., 0.15). In embodiments in which greater than one type of similarity is used, a parameterized combination function, e.g., a weighted sum, is used, such that the parameters maximize the predictive accuracy of the system.

Thus, in one embodiment the probability of revision (PR) of a nearby query to a known highly-ranked query is the behavioral similarity (BS) of the NQ to the KHRQ, i.e., number of times the nearby query has been revised (R) to the known highly-ranked query (R(NQ, KHRQ)) over the query occurrence frequency of the nearby query, each of which is determined from the log file 110 data, i.e., PR(NQ, KHRQ) =BS(NQ, KHRQ)=R(NQ, KHRQ)/QF(NQ). As a nearby query may have a record of being revised to multiple KHRQs, this calculation is made separately for each KHRQ. Once PR is determined, queries with statistically significant PR retain their classification as nearby queries, and queries with lower PR are classified as other queries (OQs). All KHRQs and NQs are stored in an index, with a pointer from each NQ to each of its respective KHRQs. The KHRQs and NQs in the index are collectively referred to as, indexed queries (IQs). PR for each indexed query also is stored in the index.

Figure 4:
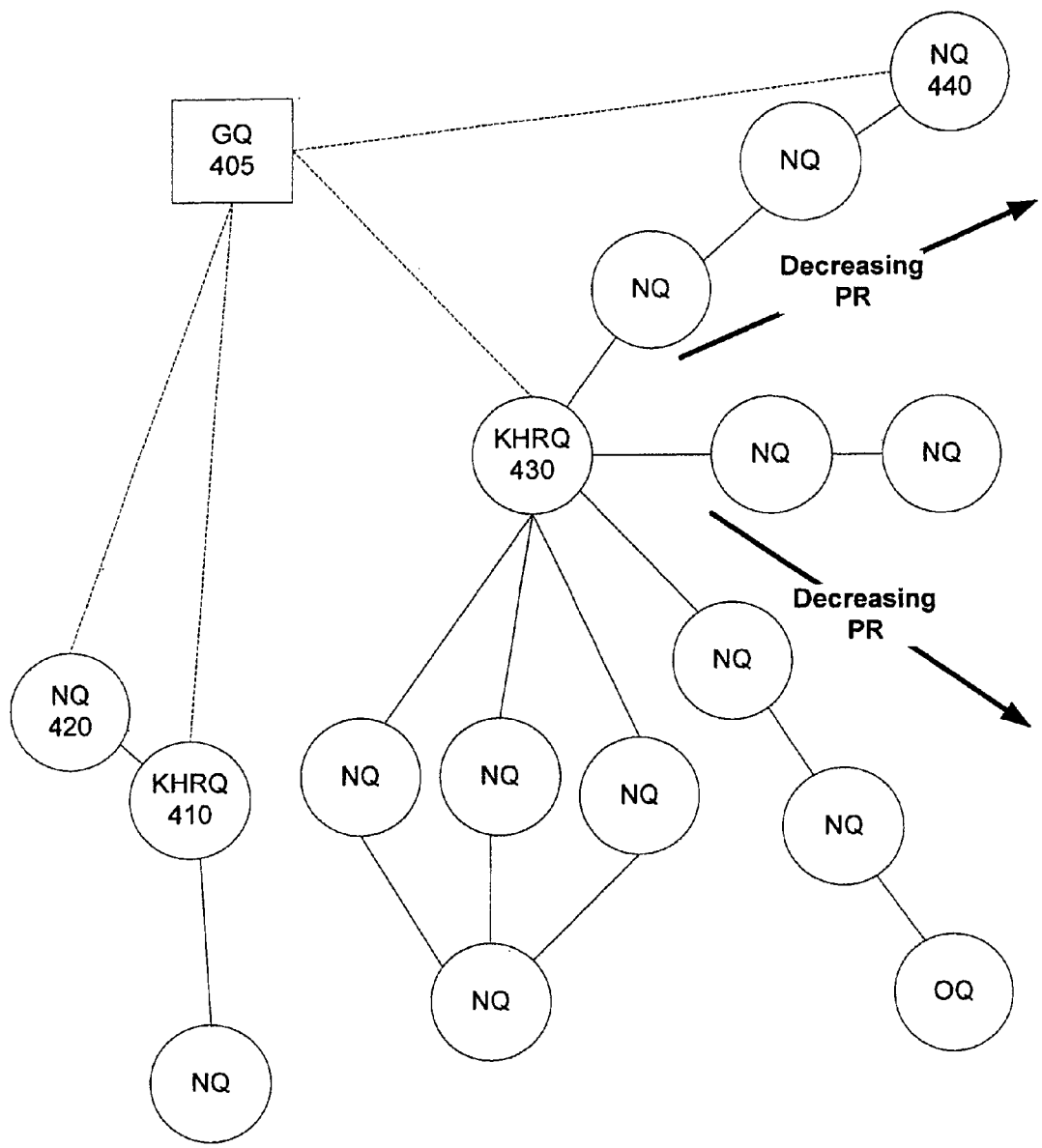
FIG. 4 illustrates a graphed topology of queries according to one embodiment of the present invention.

FIG. 4 shows an exemplary graphed topology of known highly-ranked queries (KHQQ), nearby queries (NQ), and other queries (OQ). As shown, queries one link away from a known highly-ranked query usually are classified as a nearby queries. However, queries that are farther from a known highly-ranked query are more likely to be classified as other queries, i.e., are likely to have only a negligible PR(KHRQ). As shown, PR decreases as distance from the KHRQ increases. In one embodiment, the path length between a known highly-ranked query and another query is directly factored into the probability measure.

Next, either as a continuation of the backend processes described above, or at runtime, the query rank reviser 108a measures the revision probability (RP) of a given query (GQ) to each indexed query (IQ), as measured by the similarity between the GQ and IQ. As discussed above for PR, RP can be determined based on, semantic similarity, syntactic similarity, behavioral similarity, or any combination thereof. Because in some instances RP is calculated in the same manner as PR and in some instances RI uses a different calculation, RP is used herein for evaluating the revision probability of a GQ to a KHRQ, where PR is used for calculating the probability of revision of a NQ to a KHRQ. As a backend process, the RP is calculated for each query as stored in the log files 110. As a front end process, the RP is calculated for a query as entered by a user, for example via client 118.

In one embodiment, the RP of a given query to a NQ (RP(GQ, NQ)) is the behavioral, semantic, and syntactic similarity of the GQ to the NQ. The RP of a given query to a known highly-ranked query (RP(GQ, KHRQ)) is calculated both directly and indirectly. The direct portion uses the standard RP calculation (RP(GQ, KHRQ)). The indirect portion is calculated as the sum, over all NQs that have a pointer to the KHRQ, of the product of the RP(GQ, NQ) as defined above and the RP of the NQ to the KHRQ (RP(NQ, KHRQ)). Thus, the RP of a GQ to a KHRQ is calculated both directly and indirectly, with respect to the relationship between all NQs for the KHRQ, i.e., $$RP(GQ, KHRQ) = RP(GQ, KHRQ) + \sum_{NQs}[RP(GQ, NQ) \times PR(NQ, KHRQ)].$$

Figure 5:
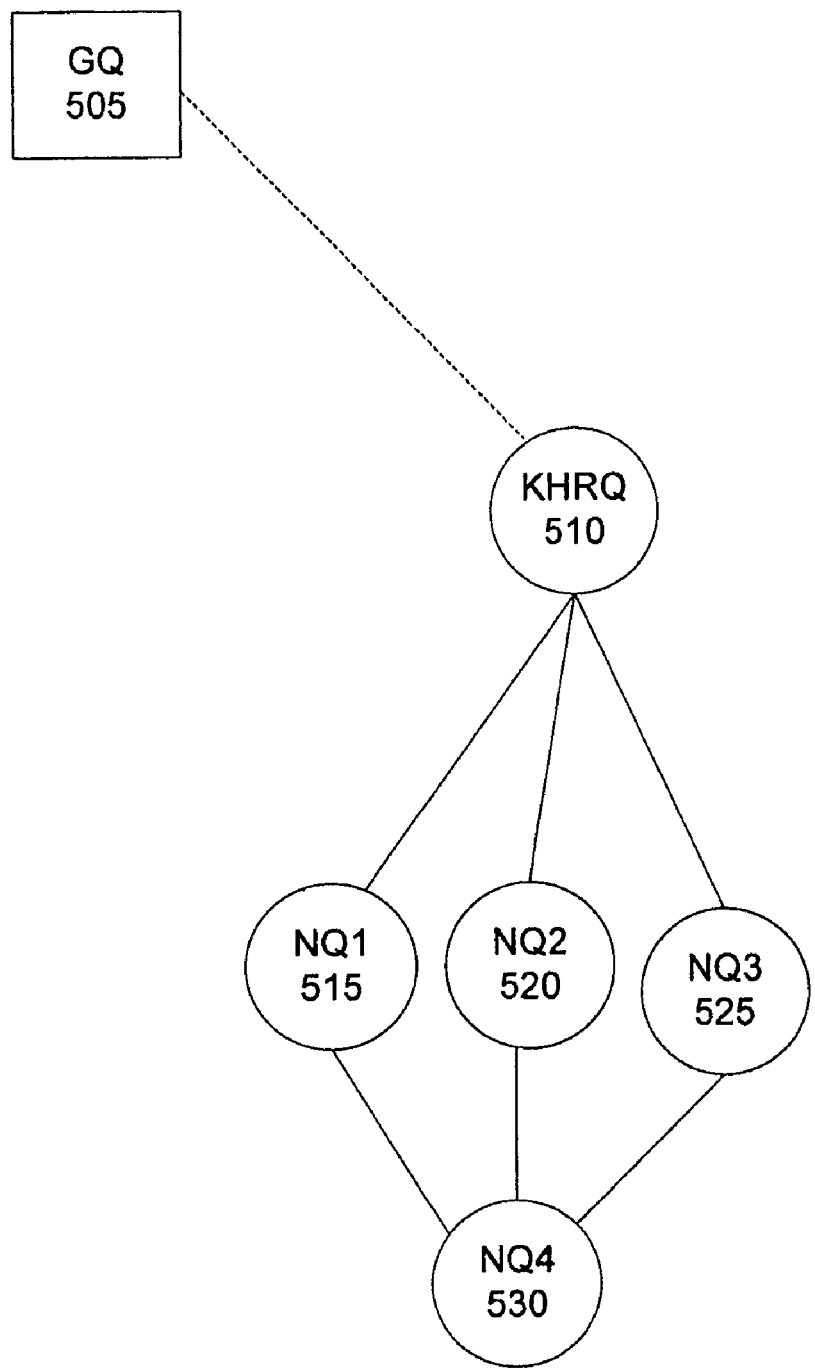
FIG. 5 illustrates a graphed topology of queries according to another embodiment of the present invention.

As a result, the less likely the probability of the NQ being revised to the KHRQ, the lower the RP. An example of a situation in which the indirect aspect of RP(GQ, KHRQ) would require the above equation can be seen with reference to FIG. 5. For example, for the RP of GQ 505 to KHRQ 510, the second half of the equation above would be the sum of the calculations for NQ1 515, NQ2 520, NQ3 525, and NQ4 530.

Next, the query rank reviser 108a calculates a revision score (RS) for each indexed query as the product of the RP for the indexed query (with respect to the given query) and the query rank for the indexed query, i.e., RS(IQ)=(GQ, IQ) x QR(IQ). The indexed queries with the highest revision scores are retrieved as alternative queries (AQ).

In one embodiment, indexed queries with the top ten revision scores are retrieved. In another embodiment, the indexed queries with the top one hundred revision scores are retrieved. Once the list of alternative queries is retrieved, the alternative queries that are known highly-ranked queries are provided as candidate revisions. For the alternative queries that are nearby queries, the corresponding known highly-ranked queries are provided as candidate revisions, using the pointers stored in the index.

As described above, each candidate revision can be associated with a confidence measure representing the probability that the revision is a good revision. In the case of the query rank reviser 108a, the revision score of the alternative query for a candidate revision is used as the confidence measure for that query.

In addition, queries that have already been revised by this or another reviser 108 can be further revised by the query rank reviser 108a.

An example of suggesting known highly-ranked queries using the query rank reviser 108a follows. A first query entered by a user is [BBQ skewers] 405. In this example, the user is interested in information about barbeque skewers. The query rank reviser 108a calculates or retrieves the revision probability of the query with respect to indexed queries. For this example, and referring again to FIG. 4, four indexed queries are used as the indexed queries: [Britney Spears] 410, a KHRQ, and one of its NQs, [B Spears] 420, and [Williams-Sonoma] 430, a KHRQ, and one of its NQs, [wooden skewers] 440. For the NQs, the probability of each being revised to its respective KHRQ (PR) also is retrieved from the index. The revision probabilities for the indexed queries 410-440 are:

RP([BBQ skewers], [Britney Spears])=0.11
RP([BBQ skewers], [B Spears])=0.3 (S)×0.8 (PR)=0.24
RP([BBQ skewers], [Williams-Sonoma])=0.05
RP([BBQ skewers], [wooden skewers])=0.95 (S)×0.3 (PR)=0.285

Thus, both of the KHRQs have a fairly low revision probability (RP) with respect to [BBQ skewers]. [B Spears] also has a relatively low RP to [BBQ skewers], but has a relatively high PR to [Britney Spears]. [wooden skewers] has a high RP to [BBQ skewers], but a low PR with respect to the KHRQ [Williams-Sonoma].

Next the query rank reviser 108a finds the revision score (RS) for each indexed query as a function of the revision probabilities from above and the query rank for each indexed query 410-440, i.e., RS(IQ)=S(GQ, IQ) x QR(IQ). The revision scores are calculated as follows:

RS([Britney Spears])=0.11×0.93 QR([Britney Spears])=0.1023
RS([B Spears])=0.24×0.35 QR([B Spears])=0.084
RS([Williams-Sonoma])=0.05×0.75 QR([Williams-Sonoma])=0.0375
RS([wooden skewers])=0.285×0.36 QR([wooden skewers])=0.1026

Thus, although [B Spears] is the second most similar to [BBQ skewers], it has a low, query rank, and thus ends up with a low RS. In addition, [Williams-Sonoma] has a high query rank, but a RP so low that it has the lowest RS of the group. The two highest RSs in the indexed queries 410-440 are [Britney Spears], which has a very high query rank and a low RP, and [wooden skewers], which has a low-to-medium query rank, but the highest RP for the group. For this example, we will assume that the top fifty percent of revision scores are retrieved as alternative queries (AQs). Therefore, [Britney Spears] and [wooden skewers] are retrieved as alternative queries.

[Britney Spears], which is a KHRQ, is returned as a candidate revision query. In addition, [Williams-Sonoma], which is the KHRQ for alternative query [wooden skewers], also is returned as a candidate revision query. In addition, because the confidence measure for the candidate revision queries, i.e., the revision score of the associated alternative query, is used in the decision whether to provide the candidate revisions to the user, the user ultimately may see only [Williams-Sonoma]. As a result, the user ends up with a suggested query [Williams-Sonoma] that sells the item for which the user was looking (wooden skewers for barbequing).

Generating Revision Confidence Measures at Runtime

Figure 1B:
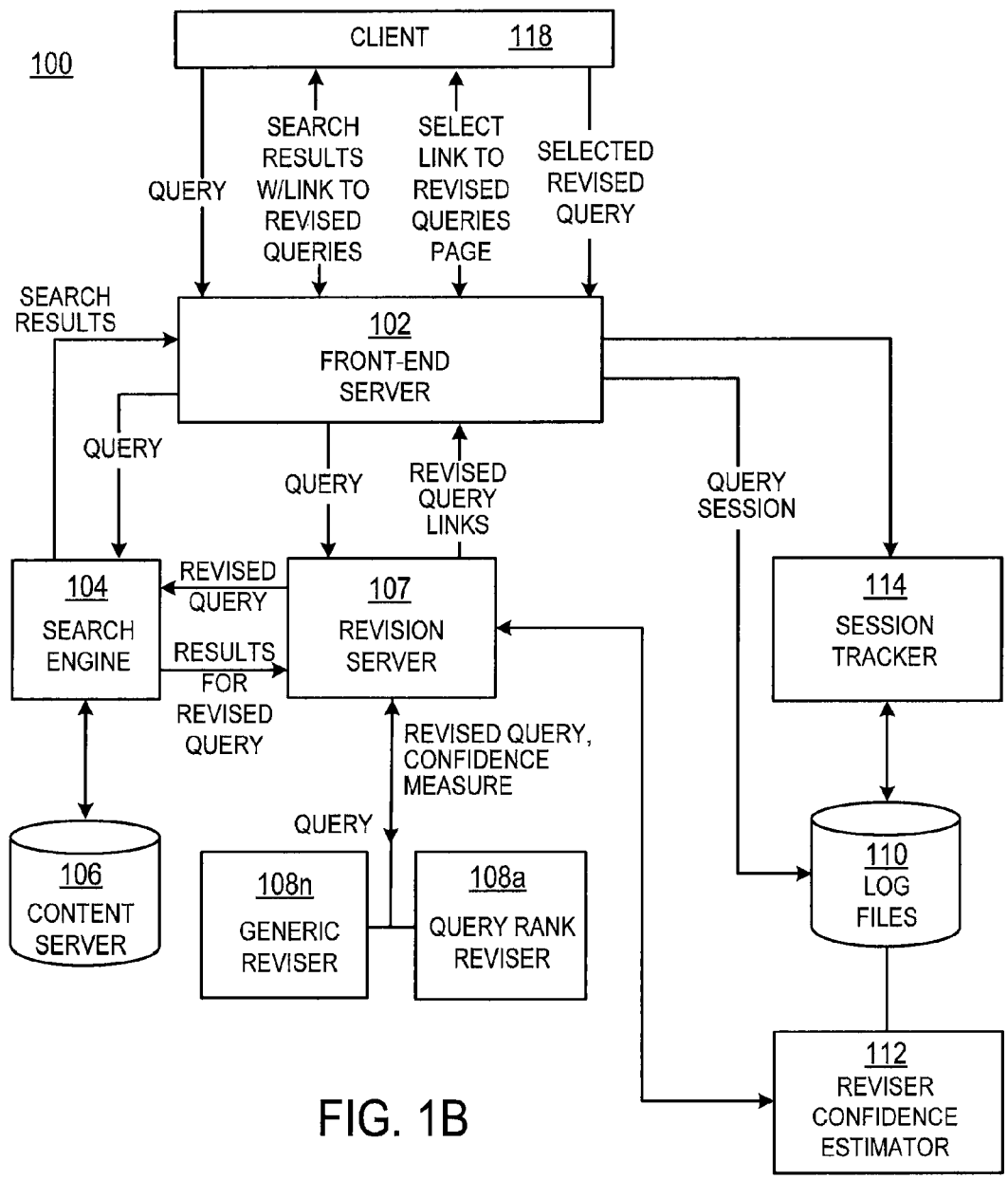

Referring now to FIG. 1b, there is shown another embodiment of an information retrieval system in accordance with the present invention. In addition to the previously described elements of FIG. 1a, there are a session tracker 114 and a reviser confidence estimator 112. As discussed above, a query reviser 108 may provide a confidence measure with one or more of the revised queries that it provides to the revision server 107. The revision server 107 uses the confidence measures to determine which of the possible revised queries to select for inclusion on the revised queries page 300. In one embodiment, confidence measures can be derived at runtime, based at least in part on historical user activity in selecting revised queries with respect to a given original query.

In the embodiment of FIG. 1b, the-front-end server 102 provides the session tracker 114 with user click-through behavior, along with the original query and revised query information. The session tracker 114 maintains log files 110 that store each user query in association with which query revision links 302 were accessed by the user, the results associated with each revised query, along with various features of the original query and revised queries for modeling the quality of the revised queries. The stored information can include, for example:

For the original query:
the original query itself;
each word in original query;
length of original query;
topic cluster of the original query;
the information retrieval score for the original query; and
the number of results for the original query.

For a revised query:
the revised query itself;
each word in the revised query;
identification of the revision technique that generated it;
length of revised query;
topic cluster associated with the revised query;
information retrieval score (e.g., page rank) for
number of results found for revised query;
length of click on revised query link 302; and
length of click on revised query results 304.

Topic clusters for queries are identified using any suitable topic identification method. One suitable method is described in U.S. application Ser. No. 10/676,571, filed on Sep. 3, 2003, entitled "Method and Apparatus for Characterizing Documents Based on Clusters of Related Words," which is incorporated by reference.

The reviser confidence estimator 112 analyzes the log, files 110 using a predictive model, e.g., a multiple, logistic regression model, to generate a set of rules based on the features of the query and the revised queries that can be used to estimate the likelihood of a revised query being a successful revision for a given query. One suitable regression model is described in U.S. application Ser. No. 10/734,584, filed Dec. 15, 2003, entitled "Large Scale Machine Learning Systems and Methods," which is incorporated by reference. The reviser confidence estimator 112 operates on the assumption that certain behaviors, e.g., a long click by a user on a revised query link 302 indicates that the user is satisfied with the revision as being an accurate representation of the user's original information need. A long click can be deemed to occur when the user stays on the clicked through page for some minimum period of time, for example a minimum of 60 seconds. From the length of the clicks on the revised query links 302, the reviser confidence estimator 112 can train the predictive model to predict the likelihood of a long click given the various features of the revised query and the original query. Revised queries having high predicted likelihoods of a long click are considered to be better (i.e., more successful) revisions for their associated original queries.

In one embodiment for a predictive model the confidence estimator 112 selects features associated with the revised queries, collects user data, such as click data, from the log files, formulates rules using the features and user data, and adds the rules to the predictive model. In addition, the confidence estimator 112 can formulate additional rules using the user data and selectively add the additional rules to the model.

At runtime, the revision server 107 provides the reviser confidence estimator 112 with the original query, and each of the revised queries received from the various query revisers 108. The reviser confidence estimator 112 applies the original query and revised queries to the predictive model to obtain the prediction measures, which serve as the previously mentioned confidence measures. Alternatively, each query reviser 108 can directly call the reviser confidence estimator 112 to obtain the prediction measures, and then pass these values back to the revision server 107. Although the depicted embodiment shows the reviser confidence estimator 112 as a separate module, the revision server 107 may provide the confidence estimator functionality instead. In either case, the revision server 107 uses the confidence measures, as described above, to select and order which revised queries will be shown to the user.

In one embodiment, revision server 107 uses the confidence measures to determine whether to show query revisions at all, and if so, how prominently to place the revisions or the link thereto. To do so, the revision server 107 may use either the initial confidence measures discussed previously or the dynamically generated confidence measures discussed above. For example, if the best confidence measure falls below a threshold value, this can indicate that none of the potential candidate revisions is very good, in which case no modification is made to the original result page 200. On the other hand, if one or more of the revised queries has a very high confidence measure above another threshold value, the revision server 107 can force the query revisions, or the link to the revised query page 300, to be shown very prominently on the original result page 200, for example, near the top of page and in a distinctive font, or in some other prominent position. If the confidence measures are in between the two thresholds, then a link to the revised query page 300 can be placed in a less prominent position, for example at the end of the search results page 200, e.g., as shown for link 206. In one embodiment, whether or where to display to the user is based in part on user dissatisfaction with the original query, based for example on zero or few results, or a low information retrieval scores.

The steps of the processes described above can be performed in parallel (e.g., getting results for a query revision and calculating a confidence measure for the query revision), and/or interleaved (e.g., receiving multiple query revisions from the query revisers and constructing a sorted list of query revisions on-the-fly, rather than receiving, all the query revisions and then sorting the list of query revisions). In addition, although the embodiments above are described in the context of a client/server search system, the invention can also be implemented as part of a stand-alone machine (e.g., a stand-alone PC). This could be useful, for example, in the context of a desktop search application such as Google Desktop Search.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the. substance of their work to others skilled in the art. These operations, while described functionally or logically, are understood to be implemented by computer programs. Furthermore, it has also proven convenient at times to refer to these arrangements. of operations as modules or by functional names, without loss of generality.

Unless specifically stated otherwise as apparent from the above discussion, it is appreciated that throughout the description the described actions and processes are those of a computer system, or similar electronic computing device, that manipulates and transforms data represented as physical (electronic) quantities within the computer system memories or registers or other such information storage, transmission, or display devices. A detailed description of the underlying hardware of such computer systems is not provided herein as this information is commonly known to those of skill in the art of computer engineering.

Certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by real time network operating systems.

Certain aspects of the present invention have been described with respect to individual or singular examples; however it is understood that the operation of the present invention is not limited in this regard. Accordingly, references to a singular element or component should be interpreted to refer to plural such components as well. Likewise, references to "a," "an," or "the" should be interpreted to include reference to pluralities, unless expressly stated otherwise. Finally, use of the term "plurality" is meant to refer to two or more entities, items of data, or the like, as appropriate for the portion of the invention under discussion, and does cover an infinite or otherwise excessive number items.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. Those of skill in the art of integrated circuit design and video codecs appreciate that the invention can be readily fabricated in various types of integrated circuits based on the above functional and structural descriptions, including application specific integrated circuits (ASICs). In addition, the present invention may be incorporated into various types of video coding devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method comprising:
ranking, using one or more computers, indexed queries based on a respective query rank of each indexed query, the query rank calculated based on a frequency of occurrence of the indexed query and a user satisfaction score of the indexed query, the indexed queries including highly-ranked queries and nearby queries that are queries that have a statistically significant probability of being revised to one of the highly-ranked queries, wherein the user satisfaction score of a particular indexed query is determined from estimates of lengths of clicks on search results, wherein the estimates of the lengths of clicks on search results are based on a duration of time from a selection of a search result for the particular indexed query to a subsequent selection of another search result;
calculating a respective revision score for each indexed query as a function of a revision probability of a first query and the respective query rank for the particular indexed query, the revision probability based on at least one of a semantic similarity or syntactic similarity between the first query and the particular indexed query;
selecting one of the indexed queries as an alternative query to the first query based on the respective revision score of the selected query; and
providing the selected query as a suggested revision for the first query.

2. The method of claim 1 in which the first query is a query revision of an earlier query.

3. The method of claim 1 in which the function is a product of the revision probability for the first query with respect to the particular indexed query and the query rank for the particular indexed query.

4. The method of claim 1 in which the alternative query is a highly-ranked query.

5. The method of claim 4, further comprising:
calculating the frequency of occurrence of the alternative query;
calculating the user satisfaction score for the alternative query; and
computing a rank for the alternative query as a function of the frequency of occurrence and the user satisfaction score,
in which the alternative query is identified as the highly-ranked query based on the rank.

6. The method of claim 5, in which the user satisfaction score is based on an inverse revision frequency.

7. The method of claim 6, in which the inverse revision frequency is the inverse of a number of times the alternative query is revised divided by the query occurrence frequency of the alternative query.

8. The method of claim 1, further comprising:
logging query data generated from user sessions; and
using the query data to generate the indexed queries.

9. The method of claim 1, in which the suggested revision is displayed to a user in a location dependent upon a relative strength of a confidence measure associated with the alternative revision.

10. A non-transitory computer storage medium encoded with a computer program, the program comprising instructions that when executed by data processing apparatus cause the data processing apparatus to perform operations comprising:
ranking indexed queries based on a respective query rank of each indexed query, the query rank calculated based on a frequency of occurrence of the indexed query and a user satisfaction score of the indexed query, the indexed queries including highly-ranked queries and nearby queries that are queries that have a statistically significant probability of being revised to one of the highly-ranked queries, wherein the user satisfaction score of a particular indexed query is determined from estimates of length of click on search result, wherein the estimates of the lengths of clicks on search results are based on a duration of time from a selection of a search result for the particular indexed query to a subsequent selection of another search result;

calculating a respective revision score for each indexed query as a function of a revision probability of a first query and the respective query rank for the particular indexed query, the revision probability based on at least one of a semantic similarity or syntactic similarity between the first query and the particular indexed query;

selecting one of the indexed queries as an alternative query to the first query based on the respective revision score of the selected indexed query; and providing the selected query as a suggested revision for the first query.

11. The computer storage medium of claim 10 in which the first query is a query revision of an earlier query.

12. The computer storage medium of claim 10 in which the function is a product of the revision probability for the first query with respect to the particular indexed query and the query rank for the particular indexed query.

13. The computer storage medium of claim 10 in which the alternative query is a highly-ranked query.

14. The computer storage medium of claim 13, in which the operations further comprise:

calculating the frequency of occurrence of the alternative query;

calculating the user satisfaction score for the alternative query; and computing a rank for the alternative query as a function of the frequency of occurrence and the user satisfaction score, in which the alternative query is identified as the highly-ranked query based on the rank.

15. The computer storage medium of claim 14, in which the user satisfaction score is based on an inverse revision frequency.

16. The computer storage medium of claim 15, in which the inverse revision frequency is the inverse of a number of times the alternative query is revised divided by the query occurrence frequency of the alternative query.

17. The computer storage medium of claim 10, in which the operations further comprise:

logging query data generated from user sessions; and using the query data to generate the indexed queries.

18. The computer storage medium of claim 10, in which the suggested revision is displayed to a user in a location dependent upon a relative strength of a confidence measure associated with the alternative revision.

19. A system comprising:

memory;

one or more processors coupled to the memory and configured to perform operations comprising:

ranking indexed queries based on a respective query rank of each indexed query, the query rank calculated based on a frequency of occurrence of the indexed query and a user satisfaction score of the indexed query, the indexed queries including highly-ranked queries and nearby queries that are queries that have a statistically significant probability of being revised to one of the highly-ranked queries, wherein the user satisfaction score of a particular indexed query is determined from estimates of lengths of clicks on search results, wherein the estimates of the lengths of clicks on search results are based on a duration of time from a selection of a search result for the particular indexed query to a subsequent selection of another search result;

calculating a respective revision score for each indexed query as a function of a revision probability of a first query and the respective query rank for the particular indexed query, the revision probability based on at least one of a semantic similarity or syntactic similarity between the first query and the particular indexed query;

selecting one of the indexed queries as an alternative query to the first query based on the respective revision score of the selected indexed query; and providing the selected query as a suggested revision for the first query.

20. The system of claim 19 in which the first query is a query revision of an earlier query.

21. The system of claim 19 in which the function is a product of the revision probability for the first query with respect to the particular indexed query and the query rank for the particular indexed query.

22. The system of claim 19 in which the alternative query is a highly-ranked query.

23. The system of claim 22, in which the operations further comprise:

calculating the frequency of occurrence of the alternative query;

calculating the user satisfaction score for the alternative query; and computing a rank for the alternative query as a function of the frequency of occurrence and the user satisfaction score, in which the alternative query is identified as the highly-ranked query based on the rank.

24. The system of claim 23, in which the user satisfaction score is based on an inverse revision frequency.

25. The system of claim 24, in which the inverse revision frequency is the inverse of a number of times the alternative query is revised divided by the query occurrence frequency of the alternative query.

26. The system of claim 19, in which the operations further comprise:

logging query data generated from user sessions; and using the query data to generate the indexed queries.

27. The system of claim 19, in which the suggested revision is displayed to a user in a location dependent upon a relative strength of a confidence measure associated with the alternative revision.

* * * * *